United States Patent [19]

Peters

[11] Patent Number: 4,881,745
[45] Date of Patent: Nov. 21, 1989

[54] MECHANICAL PLATE CLAMP

[76] Inventor: Roger D. Peters, 152 Chicago Way, San Francisco, Calif. 94112

[21] Appl. No.: 185,504

[22] Filed: Apr. 25, 1988

[51] Int. Cl.⁴ .............................................. B23Q 3/14
[52] U.S. Cl. ........................................ 279/4; 74/110;
269/48.1; 279/1 L; 279/2 A; 346/137;
360/99.12; 369/271
[58] Field of Search .............. 279/1 L, 2 R, 2 A, 140,
279/4; 346/137; 360/86, 98.08, 99.05, 99.12;
369/261, 270, 271; 92/14, 29, 84, 130 R;
74/110; 269/48.1, 48.2, 48.3, 48.4

[56] References Cited

U.S. PATENT DOCUMENTS

| 1,458,531 | 6/1923 | Hodgkinson | 346/137 |
| 2,467,020 | 4/1949 | Fischer | 74/110 |
| 3,042,289 | 7/1962 | Mikina | 92/84 X |
| 4,562,570 | 12/1985 | Denton | 369/270 |

FOREIGN PATENT DOCUMENTS

| 684677 | 12/1939 | Fed. Rep. of Germany | 74/110 |
| 164952 | 8/1985 | Japan | 369/261 |

Primary Examiner—Steven C. Bishop
Attorney, Agent, or Firm—Robert Samuel Smith

[57] ABSTRACT

A clamp for supporting a plate such as a memory disk which comprises a housing with a supporting surface in contact with one side of the plate surface and a mechanism for applying a segmented ring to the second side of the plate surface and a fluid pressure means within said housing to apply a large clamping pressure.

4 Claims, 2 Drawing Sheets

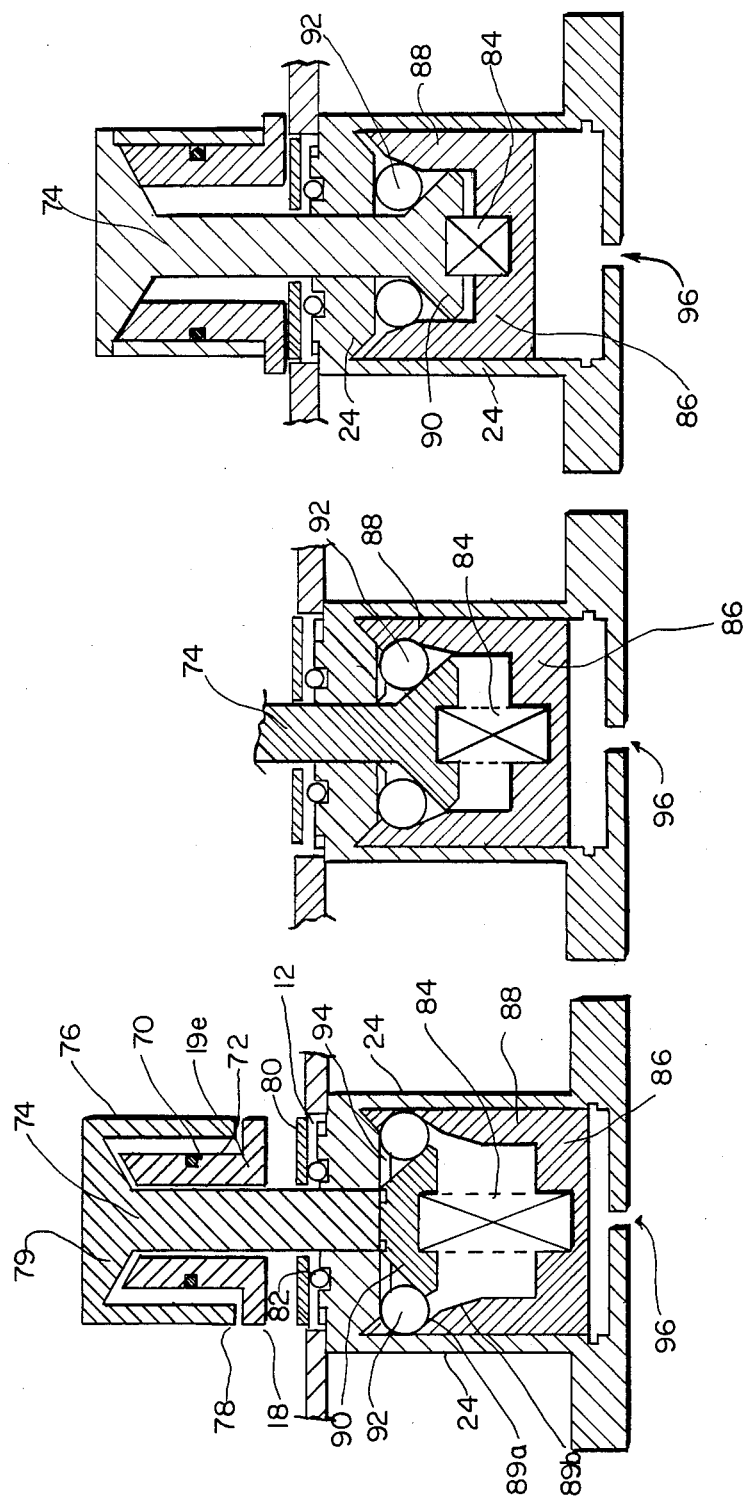

MECHANICAL PLATE CLAMP

BACKGROUND

1. Field of Invention

This invention relates to clamps such as a device for clamping a memory disk to a spindle for the purpose of testing the finished disk, burnishing or polishing, etc. This invention is an improvement over a clamp described in an application submitted by Robert Samuel Smith Ser. No. 174,593 wherein the improvement comprises a leverage means for intensifying clamping pressure which is substituted for a hydraulic means claimed in the Smith application.

2. Prior Art

Each of the many kinds of clamps usually has a number of uses and the particular type of clamp embodied in this invention may be introduced by describing the use of clamps to attach a memory disk to a plate or "chuck" such as required at several stages of the manufacturing process. These stages include test procedures, such as measuring flatness or detecting recording errors, and manufacturing procedures such as burnishing or polishing. for these purposes, the disk is clamped on both sides wherein the clamping surface is an annular flat area concentric to the disk and extending form the inside diameter.

Published standards for the industry (ANSI specifications) state that the clamping force be uniformly distributed over the clamping area wherein both the area and the force are prescribed according to the size of the disk.

Accordingly, a clamp that has been adopted throughout the industry comprises a circular plate attached concentrically near the end of a spindle axis and having a shoulder around its perimeter. The disk is thereby positioned concentric to the spindle by the shoulder and is supported by the flat annular surface of the plate pressing on one side and a collar that is mounted concentrically and presses on the opposite side of the disk. In older versions of the prior art, the collar screwed onto the end of the spindle protruding through the center of the disk but in more recent designs, force is applied automatically by pneumatic means after the operator positions the collar on top of the disk. The use of this clamping means is limited to manual operation in that the operator must remove the collar in order to remove the disk.

Another type of clamp is designed so that, after the disk is laid onto a supporting plate, fingers are made to extend over the clamping area in order to secure the disk. An inherent disadvantage of this design is that the fingers cannot cover the entire clamping area.

Still another type of chuck is the so called "bladder" chuck in which the disk is positioned by a collar onto a spindle supported plate and then air pressure is applied which causes a bladder to expand out over the clamping area of the disk. This design is amenable to automatic or robotic operation since there is no requirement to attach or remove a collar. However, this design does not provide the desired uniform pressure over the clamping area and the bladder clamps that are available commercially do not provide a clamping force called for in the ANSI specification. For example for a five inch disk, the clamping force specified in the ANSI specification is 250 pounds whereas the clamping force of the typical bladder chuck is about 50 pounds.

The Smith application discloses a clamping element that comprises a segmented ring such that in the clamping position, the ring covers the entire annular clamping area, and in order to unload the disk, the segmented ring withdraws within the projected boundary of the inner diameter of the disk so that the clamp need not be removed in order to unload the disk. The Smith application further features a hydraulic means by which pressure is applied to the segmented ring in order to provide the clamping force prescribed by the ANSI specification. The Smith clamp poses the possibility that continuous use of the clamp could result in wear that would result in leakage of hydraulic fluid.

SUMMARY OF THE INVENTION

It is an object of this invention to provide a chuck that is suitable in applications such as the clamping attachment of a memory disk concentrically onto the end of a spindle.

It is another object of this invention to provide a chuck in which the clamping surface is an annular area adjacent to the inner diameter of the disk and in which the clamping pressure is uniform over the entire clamping area.

It is a further object of this invention to provide a chuck which does not require removal of a collar so that the chuck of this invention is amenable to its use in robotic and automatic operations.

Still another object of this invention is to provide a chuck wherein the clamping force is substantially greater than is provided by clamps of the prior art and in which the possibility of leakage of hydraulic fluid such as exists with the Smith design is eliminated.

In one embodiment of this invention, a flat plate such as a memory disk having an inside circular mounting hole is laid onto an annular supporting surface that is adjacent and concentric to the mounting hole. the disk is clamped to the supporting surface by a segmented flat ring that presses against the side of the disk opposite to the supporting surface and concentric with the mounting hole. In order to remove the disk, one set of segments of the clamping ring moves further away from the disk surface than other segments so that all of the segments may move inward toward the center of the mounting hole and within the projected boundary of the mounting hole without interference of any segment with its neighboring segment. Therefore, in the "unload" configuration, all of the segments are inside the projected boundary of the mounting hole of the memory disk so that the disk may be lifted vertically from the supporting surface. An essential feature of this embodiment is, therefore, to provide the advantages of complete areal coverage by a segmented clamping ring together with a means of retracting segments of the ring to within the projected boundary of the interior hole so that the disk may be removed without the necessity of manually removing a cap.

The means to retract the ring segments comprises a cup having a lip which presses against one flat side of the segmented rings in the clamping position and are withdrawn out of contact with the segmented ring in the unclamped position. The cup is attached at the center of its flat bottom to a rod positioned axially through the segmented ring. The inner edges of the segments of the ring are maintained in contact with a cam on the surface of the rod by an elastic band. The rod moves axially so that when the cup is lifted out of contact with the cup, the elastic band causes the segments to slide on the cam to within the inner projected boundary of the clamping area. Each segment is also guided by the beveled boundary with its neighbor so that as the segment moves inward toward the unclamped position, it slides out of plane with respect to its neighbor.

In order to prevent sliding of the segment on the disk surface which would cause damage to the surface, the clamping surface of the segments moving toward clamping position first contact one side of a flat gasket (TEFLON plastic preferred) whose opposite side is supported by a compressible "O" ring. Therefore, the first movement of the segments approaching clamping position is to slide into a coplanar configuration. As pressure from the edge of the cup on the segments is increased, the "O" ring is compressed so that the no flattened segmented ring comes perpendicularly into direct contact with the clamping area of the disk.

A second feature of this invention is the means to apply a clamping force to the segmented ring which, at first, is relatively moderate as the cup moves into contact with the segmented ring and then increases up to a substantially greater value.

In order to provide this two stage application of pressure, the second end of the sliding rod has a cam and contacts one end of a spring whose other end contacts the flat side of a piston. A plurality of bearing balls are confined between the cam on the rod, the inner surface of a housing that encloses the piston, and a contoured surface on the inner surface of a cylindrical extension at one end of the piston. When pneumatic pressure is applied to an opposite side of the piston causing the piston and attached cylinder to slide in the housing, the bearing balls are forced inward against the rod cam causing the rod to slide toward the clamping position. The relative shapes of the cam and contoured surface contacted by the balls is such as to cause the clamping force to increase as the rod moves closer to clamping position. When pneumatic pressure is reduced, the spring between piston and rod causes the rod and piston to separate toward the unclamped position.

BRIEF DESCRIPTION OF THE DRAWINGS

FIGS. 4a-4c show details of the assembly for securing the disk.

DETAILED DISCUSSION OF THE DRAWINGS

Figure 1:
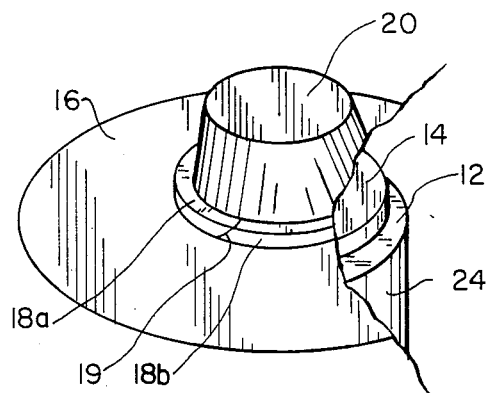
FIG. 1 is a prior art view of a disk and disk clamp in the clamped position.

Turning now to a detailed discussion of the drawings, there is shown in FIG. 1, an isometric view of the prior art clamping device as described in the application of Robert Samuel Smith. The disk 16 is partly cut away to show the underlying support surface 12 which is a top surface of housing 24. The disk 16 is positioned by the shoulder 14 and clamped by the support surface 12 on one side. The other side is clamped by four clamping segments (two segments, 18 a and b are shown in FIG. 1) that completely cover the required clamping area which is an annular border around the inside diameter of the disk 16.

Figure 2:
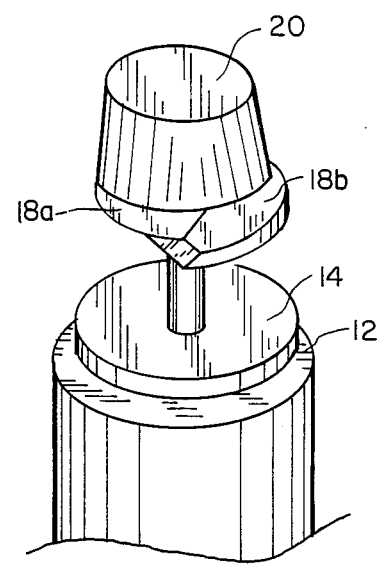
FIG. 2 is a prior art view of a disk and disk clamp in the unload position.

In the clamping position as shown in FIG. 1, a cup 20 presses against the segments 18. In the unclamped position shown in fig.2, the cup 20 is lifted away from the disk and the segments 18 a and b have been retracted to within the inside boundary of the disk 16 so that the disk can be lifted from the support surface.

Figure 3:
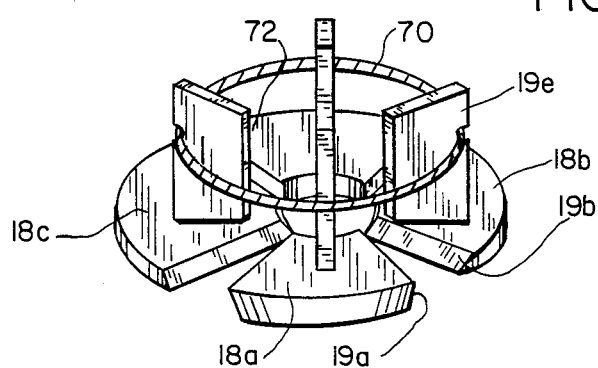
FIG. 3 shows details of the clamping segments.

In the present invention, the means by which the clamping and unloading positions of the segments are achieved may be understood by reference to FIG. 3, and 4.

FIG. 3 shows a view of the four segments. Each segment is pie shaped having two straight edges that are beveled. The bevel of each edge is complementary to the edge of the adjacent edge of the neighboring segment (see bevel 19a shown complementary to bevel 19 b in FIG. 3 Each segment has a leg 19e.

As shown in FIG. 3 and the sectional views of fig.4 A, an elastic band 70 around all of the legs maintains contact between the inner edge 72 of each segment and the surface of a rod 74 positioned axially with respect to the segmented ring 18. One end of the rod 74 is attached to the center of the inner flat surface of a cup 76 whose lip 78 forces the segments against the clamping area of the disk in the clamping position.

The unload position is illustrated in FIG. 4A and the clamped position is illustrated in FIG. 4C. When the cup 76 is withdrawn from the segments toward unloading position, the elastic band 70 causes the segments 19 to slide to within the inner projected boundary of the clamping area of the disk. The bevelled edges of each segment cause each segment to slide out of plane with its neighbor so that the corner of a segment does not interfere with the corner of the neighboring segment as the segments slide into unloading position.

When the assembly moves toward clamping position, then before the segments contact the disk clamping area, a cam 79 on the rod surface causes the segments 18 to slide on the flat surface of a bearing disk 80 whose opposite side is supported by a compressible "O" ring 82 located in the support surface 12. First the segments slide on the bearing surface into coplanar position out of contact with the clamping area of the disk 16 so as not to scratch the surface of the disk 16. Then, as force by the cup 76 on the segments 19 is continued, supporting "O" ring 82 is compressed so that the segments move normally into contact with the clamping surface of the disk.

Figure 5:
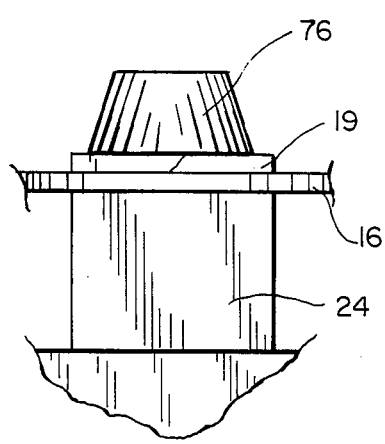
FIG. 5 shows a side view of the clamp and disk.

In order to discuss the means for causing the rod 74 to slide between clamping and unclamping position, reference is made to the side view of the entire assembly in FIG. 5 showing the cup 76, segments 19, disk 16 and support housing 24.

Sectional views of the means for applying force to the rod contained within the housing 24 are shown in FIG. 4 A, B and C. FIG. 4A shows the end of the rod 74 in the fully unloaded position; FIG. 4B shows the rod 74 in an intermediate position; FIG. 4C shows the rod in the unclamped position.

In FIG. 4 is shown the second end of the rod 74 extending into housing 24 and having an end in contact with one end of a spring 84 whose second end is in contact with the first end of a piston 86. Pneumatic pressure applied through an orifice 96 in the housing, forces the piston 86 from the unloading position (FIG. 4a) to the clamped position (FIG. 4c). The piston 86 has a cylindrical shell 88 attached concentrically to its first end whose inner surface 89 is contoured. The second end of the rod 74 has a cam 90 and a plurality of bearing balls 92 are confined within the cam 90, the contoured surface 89 of the cylinder extension and the inner surface 94 of the end plate of the housing 24. The contoured surface 89 has a first and second slope (respectively 89 a and b) so that the force on the clamping rod first moves with moderate force when the first slope contacts the bearing balls 92 and with increased force when the second slope 89b contacts the bearing balls 92. When pneumatic pressure on the piston is reduced, the compressed spring 84 causes the rod and piston to move toward the opposite unload position shown in FIG. 4a.

Figure 6:
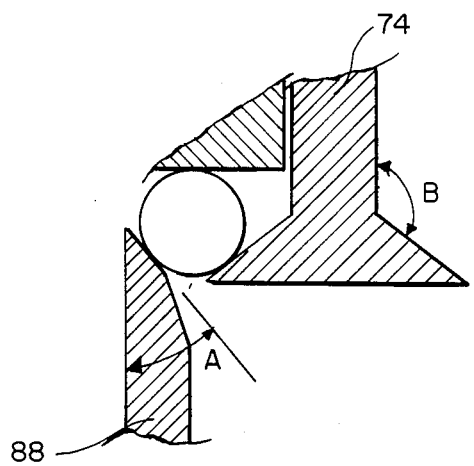
FIG. 6 shows details of the force intensifying mechanism.

Referring to FIG. 6, it may be seen that by appropriate choice of the slopes of the contoured surface and the cam 90, the force provided by this arrangement is greater than can be achieved with the piston alone. That is $$F1 = F2 \tan A \tan B$$

where
- F1 is the force on the rod 74;
- F2 is the pneumatic force on the piston
- A is the angle between the axis of the rod and the cylinder wall at its point of contact with the bearing ball;
- B is the angle between the cam and the axis of the rod.

I claim:

1. A clamp for supporting a supported plate having a first side and a second side and an opening and a clamping area with a projected boundary on both said sides around said opening which comprises:
   - a plate support means having a first clamping surface in contact with said clamping area on said first side;
   - a segmented clamp means which comprises at least three segments and each segment comprises a flat segment plate having a straight beveled edge whose angle is complementary to an adjacent edge of a segment plate of a neighboring segment so that when said segments are withdrawn to said unloading position within said projected boundary, beveled edges of neighboring segments slide over one another so that said segment plates move to different planes thereby avoiding interference with one another and when said segment plates are in said clamping position, said adjacent beveled edges are in complementary contact with one another so that all the segment plates of all said segments lie in the same plane and wherein each said segment plate has attached to it an elastic band attachment means;
   - a clamp positioning means which moves said segmented clamp means between said clamping position and said unloading position which comprises a flat bearing having a surface in contact with said segment plates and a rod having a cam on its surface and an elastic band attached to said band attachment means which maintains said segments in sliding contact with said cam so that when said rod slides axially, said segments are constrained by said bearing surface and said cam to move between said unloading position and said clamping position.

2. A clamp as in claim 1 wherein said rod has a first end said clamp positioning means further comprises a cup having a flat inside surface to which is attached said first rod end and cup edge so that when said rod moves toward said clamping position said cup forces said segment plates towards contact with said clamping area of said supported plate.

3. A clamp as in claim 2 wherein said bearing has a second surface and said clamp positioning means further comprises said second bearing surface being in contact with a compressible member that is supported by said plate support means so that as the segment plates move toward said clamping position, they are first maintained out of contact with said clamping area and then as said cup edge applies greater force to said segment plates, said compressible member is compressed to allow clamping contact between said segment plates and said clamping area of said supported plate.

4. A clamp as in claim 3 wherein said rod has a second end and said clamp positioning means further comprises:
   - a housing having an internal surface;
   - a piston having a first side and a second side within said housing;
   - a spring having one spring end in contact with said first piston side and a second spring end in contact with said second rod end;
   - a cam on said rod near said second rod end and having a cam surface;
   - a cylindrical extension of said piston having a contoured internal surface which defines one boundary of a space whose other boundaries are said internal housing surface and said cam surface;
   - a plurality of bearing balls within said space;
   - so that when pressure is applied to said second piston end, said internal contoured cylindrical surface presses against said bearing balls and said bearing balls press against said rod cam thereby applying greater force on said rod than force of said pressure against said second piston end.

* * * * *